Patented Oct. 24, 1933

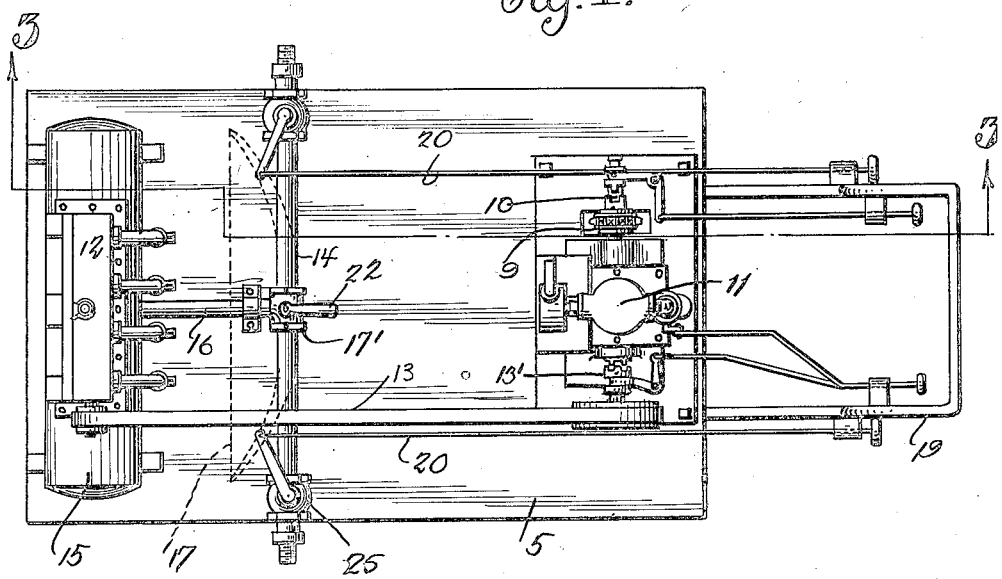
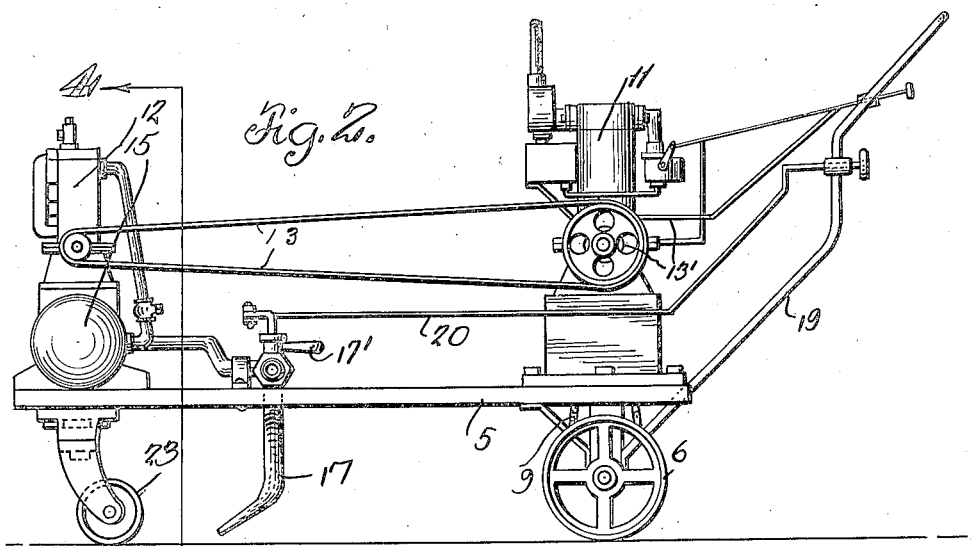

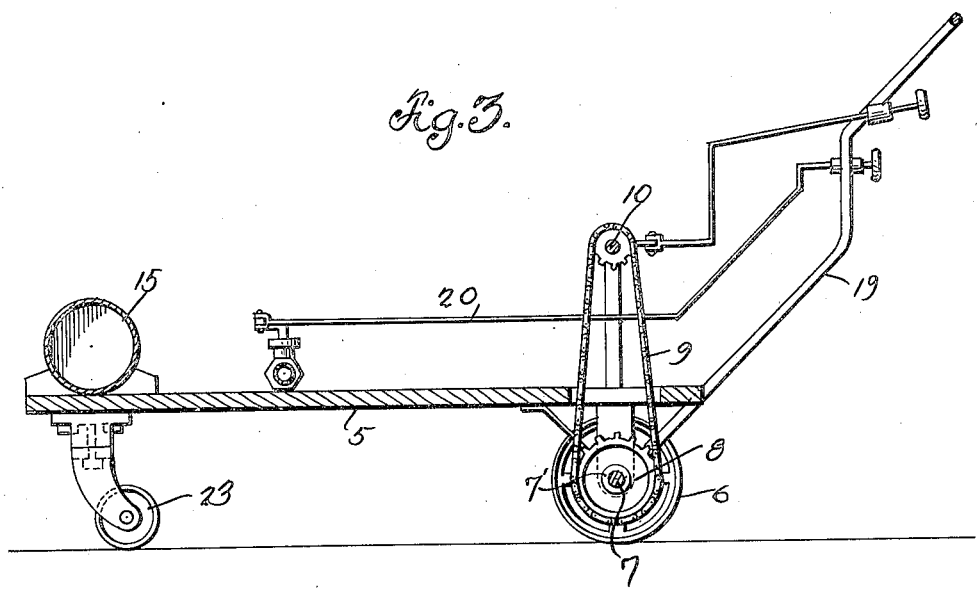
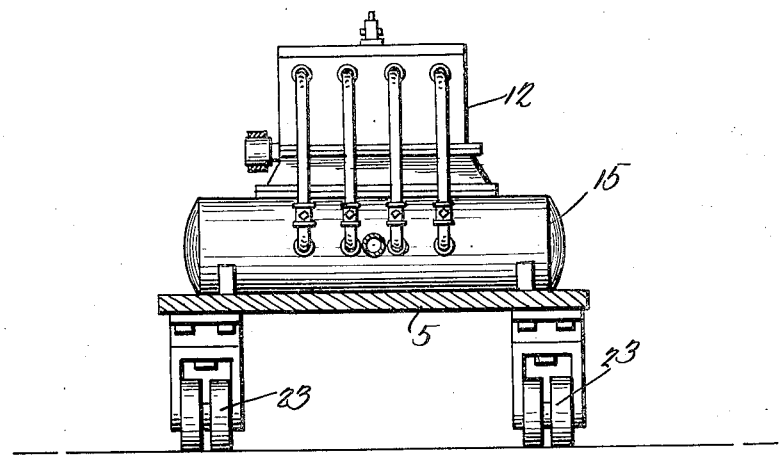

1,932,137

UNITED STATES PATENT OFFICE 1,932,137

LAWN CLEANER

Noble E. Jinkerson, Sacramento, Calif.

Application October 31, 1930. Serial No. 492,585

1 Claim. (Cl. 15—20)

This invention has relation to lawn cleaners, that is to implements of a character similar to lawn mowers, and comprising a platform carriage or frame mounted on wheels and equipped with a propelling handle by which it may be moved over the surface of a lawn or grass grown lot, to loosen leaves, stones, sticks and other matter and cause the same to be accumulated in heaps or piles, to be afterwards removed by any suitable means.

The implement embodying the present invention is constructed and adapted to utilize the force of compressed air, driven against the material to be piled, and comprises a suitable carriage upon which is mounted a gasoline motor, an air pump driven thereby, and a compression tank, the latter being connected to a tube or tubes, located above and near the surface of the ground with conveniently arranged valve controlled nozzles or outlet devices by means of which the lawn or other surface may be effectively cleaned of the leaves, and other materials and objects, and the same gathered into piles or heaps which may be loaded into suitable conveyors and removed entirely from the lawn.

The invention consists of an implement for the purpose recited having the constructional and operative features hereinafter more particularly described and claimed.

In the accompanying drawings illustrating a preferred embodiment of the invention, Figure 1 is a plan view of the lawn cleaner complete;

Figure 2 is a side elevation of the same;

Figure 3 is a central longitudinal sectional view; and

Figure 4 is a transverse vertical section on the line 4—4 of Figure 2.

In the drawings, the numeral 5 designates a horizontal platform which, at its rear end, is mounted on small traction wheels 6 supported by a horizontal axle 7 having its bearings in brackets 7' and upon which is mounted a sprocket wheel 8 with which a sprocket chain 9 engages.

This chain passes upward through an opening in the platform 5 and engages with a small sprocket wheel 10, on the power shaft of the water cooled motor 11. The motor is of any suitable type and is preferably a gasoline or internal combustion motor. It is mounted on the platform 5 at the rear end thereof. Its specific structure need not be described.

At the opposite or front end of the platform, an air compressor pump 12 is mounted and is driven from the engine by means of a crank shaft drive or pulley and belt connections 13 of any available character and having a suitable clutch 13'. A compression tank 15 is also mounted on the platform 5 and is charged from and by the pump. An outlet tube 16 is connected to the tank and leads therefrom to the valved transverse tube 14 leading to the discharge nozzle 17, having its discharge openings below the platform and near the surface of the ground.

The transverse tube 14 is threaded at opposite ends for attachment of conduits or the like so as to provide for extended blowers wherever desired. Each end of the tube 14 is provided with a valve 25 controlling flow of air through the tube ends and the operating handles for the valves have independently operable link rod connections 20 therewith that extend rearwardly to the guide frame handle 19 for the wheeled frame.

The connection between the tube 16 and tube 14 may be a T 17', and provided with a hand operated valve 22.

The platform 5, at its forward end is mounted on casters 23 which are preferably of the two roller type.

I claim:—

A lawn cleaner comprising a wheel supported platform, a self-contained power plant on the platform adapted for the propulsion of the cleaner, an air compressor and associated storage tank on the platform in operative communication with the power plant, an air pipe leading from the tank, a cross pipe having a T connection with the air pipe, a discharge nozzle carried by the cross pipe and depending below the platform with its outlet directed forwardly of the travel of the cleaner, a control valve in the T connection, a valve at each outer end of the cross pipe, a stearing frame handle on the platform, independently operable rods for the end valves of the cross pipe supported on the frame handle and independent means supported on the frame handle for controlling communication between the power plant and air compressor, and controlling propulsion of the cleaner.

NOBLE E. JINKERSON.